US011402526B2

(12) United States Patent
Husom

(10) Patent No.: US 11,402,526 B2
(45) Date of Patent: Aug. 2, 2022

(54) SEISMIC SENSOR SYSTEM WITH MICROELECTROMECHANICAL SYSTEMS ("MEMS") OSCILLATOR CLOCK

(71) Applicant: WesternGeco LLC, Houston, TX (US)

(72) Inventor: Vidar Husom, Asker (NO)

(73) Assignee: WesternGeco L.L.C., Houston, TX (US)

( * ) Notice: Subject to any disclaimer, the term of this patent is extended or adjusted under 35 U.S.C. 154(b) by 130 days.

(21) Appl. No.: 16/488,774

(22) PCT Filed: Mar. 2, 2018

(86) PCT No.: PCT/US2018/020582
§ 371 (c)(1),
(2) Date: Aug. 26, 2019

(87) PCT Pub. No.: WO2018/160923
PCT Pub. Date: Sep. 7, 2018

(65) Prior Publication Data
US 2020/0064503 A1    Feb. 27, 2020

Related U.S. Application Data

(60) Provisional application No. 62/466,473, filed on Mar. 3, 2017.

(51) Int. Cl.
*G01V 1/18*    (2006.01)
*G01V 1/16*    (2006.01)

(52) U.S. Cl.
CPC ............... *G01V 1/164* (2013.01); *G01V 1/18* (2013.01); *G01V 2200/12* (2013.01)

(58) Field of Classification Search
None
See application file for complete search history.

(56) References Cited

U.S. PATENT DOCUMENTS 5,565,816 A    10/1996  Coteus
7,558,157 B1 *  7/2009  Gardner ............... G01V 1/22
                                                367/76
(Continued)

FOREIGN PATENT DOCUMENTS

CA           2691160 A1 *  8/2010  ............... G01V 1/32

OTHER PUBLICATIONS

International Preliminary Report on Patentability issued in the related PCT application PCT/US2018/020582, dated Sep. 12, 2019 (14 pages).

(Continued)

*Primary Examiner* — Hovhannes Baghdasaryan
(74) *Attorney, Agent, or Firm* — Fletcher Yoder, P.C.

(57) ABSTRACT

Embodiments included herein are directed towards a seismic spread system that may use a MEMS oscillator as a timing reference. The system may include a plurality of nodal seismic sensor units. The system may also include a plurality of MEMS oscillator clock devices, wherein each of the plurality of MEMS oscillator clock devices is associated with a respective one of the plurality of nodal seismic sensor units, the plurality of MEMS oscillator clock devices being configured to input time synchronization to the seismic system. Each MEMS oscillator clock device may include a MEMS resonator in communication with an integrated circuit.

23 Claims, 8 Drawing Sheets

(56) References Cited

U.S. PATENT DOCUMENTS

| | | | |
|---|---|---|---|
| 9,103,845 B2 | 8/2015 | Schlarmann et al. | |
| 2007/0176690 A1* | 8/2007 | Sutardja | H03L 5/00 |
| | | | 331/8 |
| 2011/0032798 A1 | 2/2011 | Ray et al. | |
| 2011/0254760 A1 | 10/2011 | Lloyd et al. | |
| 2012/0256743 A1* | 10/2012 | Horton | G01S 13/876 |
| | | | 340/539.13 |
| 2013/0321051 A1 | 12/2013 | Sonntag | |
| 2017/0248732 A1* | 8/2017 | Song | G01R 33/3628 |

OTHER PUBLICATIONS

Examination Report issued in the related GC Application GC/2018/34875, dated Oct. 7, 2019 (5 pages).
Eurasian Patent Organization (EAPO) Official Action for Application No. 201992064/31; dated Jun. 2, 2020, 7 pgs.
Tim Dean, Kevin O'Connel & John Quigley; (2013) A review of nodal land seismic acquisition systems, Preview, 2013:164, 34-39, DOI: 10.1071/PVv2013n164p34.
International Search Report and Written Opinion issued in the related PCT application PCT/US2018/020582, dated Jun. 12, 2018 (15 pages).
Examination Report issued in the related GC Application GC/2018/34875, dated Jan. 14, 2020 (3 pages).
The Extended European Search Report issued in EP application 18760736.1, dated Nov. 6, 2020 (6 pages).

* cited by examiner

SEISMIC SENSOR SYSTEM WITH MICROELECTROMECHANICAL SYSTEMS ("MEMS") OSCILLATOR CLOCK

CROSS-REFERENCE TO RELATED APPLICATIONS

This application claims the benefit of U.S. Provisional application having Ser. No. 62/466,473 filed on Mar. 3, 2017, the entire contents of which is incorporated herein by reference in its entirety.

TECHNICAL FIELD

The present application relates to seismic survey systems and hardware, and more particularly to the clock systems used therein and those using (Microelectromechanical systems) MEMS oscillator as a timing reference.

BACKGROUND

This section provides background information to facilitate a better understanding of the various aspects of the disclosure. It should be understood that the statements in this section of this document are to be read in this light, and not as admissions of prior art. The following background is meant to help the understanding of a skilled person regarding the claimed combinations of features and is not mean in any way to be a complete summary of claimed subject matter, or to unduly limit any present or future claims related to the present application.

Seismic surveys are used to determine various features of an earth formation, such as the presence or lack thereof of various minerals. Seismic surveys can be used to determine if hydrocarbon deposits are present in an earth formation. A seismic survey can be performed by using a seismic source to produce an impulse that travels into an earth formation thereby reverberating and/or reflecting off of the earth formation. The reverberations and/or reflections are then detected and recorded by a seismic sensor and recording system. The data that is derived therefrom can be analyzed and used to determine characteristics of the formation. It is possible to display such in a visual form, or keep it in digital data form.

One type of seismic survey takes place on land and is called a land seismic survey. In land seismic surveys an impulse is introduced into the formation and seismic sensors are placed in contact with the formation (on and/or into the formation). The sensors can be hydrophones, geophones, or other general types of sensors capable of detecting the reverberations and/or reflections of the impulse. It is possible to use a large spread of interconnected sensors that in turn connect with a recording device(s). Some of the issues encountered in a land survey are lighting strikes, animal damage (e.g., rats chewing cables), and other degradations caused by the elements. The sensors in a spread can be connected by way of wireless communication, cabled communication, or a combination thereof. Sensors can also be in what is called a "blind" configuration, where a sensor or group of sensors are connected to a recording device that is independent of a central recording unit, and is scavenged at various times in various ways.

Another type of survey is a marine seismic survey, and within that a towed marine seismic survey. In a towed marine seismic survey a boat tows a series of seismic streamers. Seismic streamers are cables that have integrated thereto and/or therein seismic sensors. In the same spirit as a land survey, a marine seismic survey introduces an impulse to the earth formation. The impulse can be created by air guns or marine vibrators. The impulse(s) can travel through the water and into the formation, where they reverberate and/or reflect. The reverberations and/or reflections travel back through the water and are detected by the seismic sensors on the streamers and can be recorded. The data that is derived therefrom can be analyzed and used to determine characteristics of the formation. It is possible to display such in a visual form, or keep it in data form. It is also possible to use seismic sensors that are located on the seabed.

In seismic exploration, the general principals of which are long well known, are not repeated in great detail herein in the interest of focus. An impulse is inputted into the ground formation, and that impulse reflects and refracts and is otherwise affected by the various features in the formation. Sensors are used to then detect the reverberations and reflections of that impulse, and data is derived therefrom. The data can be analyzed to them derive information about the underlying formation.

Accordingly, the present application relates to various ways to improve upon known seismic systems to provide an improved performance and cost of ownership.

Summary of Disclosure

The following brief summary is meant to help the understanding of a skilled person regarding the claimed combinations of features and is not mean in any way to be a complete summary of claimed subject matter, or to unduly limit any present or future claims related to the present application.

In one implementation, a seismic spread system that may use a MEMS oscillator as a timing reference is provided. The system may include a plurality of nodal seismic sensor units. The system may also include a plurality of MEMS oscillator clock devices, wherein each of the plurality of MEMS oscillator clock devices is associated with a respective one of the plurality of nodal seismic sensor units, thereby inputting time synchronization to the seismic system and collected data. Each MEMS oscillator clock device may include a MEMS resonator in communication with an integrated circuit.

In some implementations, the seismic spread system may include a marine node spread. The seismic spread system may include a land nodal spread. The seismic spread system may include units of plurality of nodes coupled with a respective MEMS oscillator. The integrated circuit may include a charge pump and a sustaining circuit in communication with the MEMS resonator. The integrated circuit may further include a phase locked loop in communication with the sustaining circuit.

In another implementation, a seismic nodal sensor is provided. The sensor may include a sensor element and a MEMS oscillator clock device in communication with the sensor element. The MEMS oscillator clock device may include a MEMS resonator in communication with an integrated circuit. The MEMS oscillator clock device may be configured to input time synchronization to the seismic nodal sensor.

In some implementations, the sensor element may be a three axis sensor element device. The seismic sensor may be connected with one or more additional seismic sensors by way of wireless signals. The seismic nodal sensor may include a plurality of sensors that are cabled and associated with the MEMS oscillator clock device. The seismic nodal sensor may be a blind nodal sensor group. The integrated circuit may include a memory. The integrated circuit may include a charge pump and a sustaining circuit in communication with the MEMS resonator. The integrated circuit may further include a phase locked loop in communication with the sustaining circuit.

In another implementation, a method for using a MEMS oscillator as a timing reference is provided. The method may include providing a plurality of nodal seismic sensor units. The method may further include generating a time reference for each of the plurality of nodal seismic sensor units using a plurality of MEMS oscillator clock devices. Each of the plurality of MEMS oscillator clock devices may be associated with a respective one of the plurality of nodal seismic sensor units, thereby inputting time synchronization to the seismic system. Each MEMS oscillator clock device may include a MEMS resonator in communication with an integrated circuit.

In any of the above implementations, the seismic nodal sensor can comprise a primary clock device which provides timing to the seismic nodal sensor. The primary clock device can be of lower accuracy than the MEMS oscillator clock device. The MEMS oscillator clock device is in communication with the primary clock device and can be used to intermittently provide time synchronization to the seismic nodal sensor. Thus a lower power, lower cost primary clock can be synchronized intermittently using the MEMS oscillator clock device.

In some implementations, the seismic spread system may include a marine node spread. The seismic spread system may include a land nodal spread. The seismic spread system may include units of plurality of nodes coupled with a respective MEMS oscillator. The integrated circuit may include a charge pump and a sustaining circuit in communication with the MEMS resonator. The integrated circuit may further include a phase locked loop in communication with the sustaining circuit.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures. The following brief description of the drawings details a number of combinations of embodied features of the present disclosure, and is not meant in any way to unduly limit any present or future related claims.

Like reference symbols in the various drawings may indicate like elements.

DETAILED DESCRIPTION

Seismic Sensor

Figure 1:
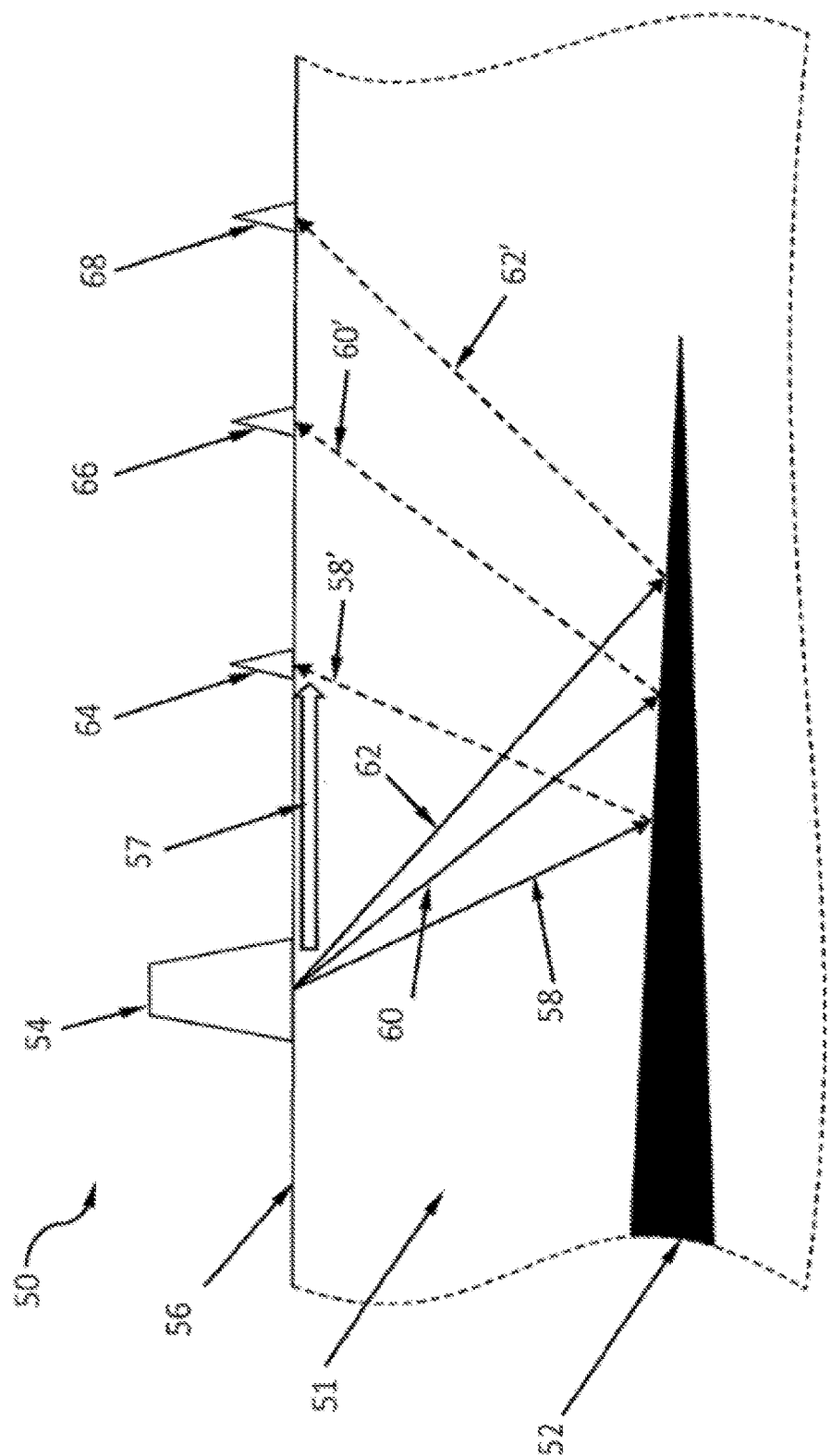
FIG. 1 shows a seismic sensing system.

Seismic surveying, or reflection seismology, is used to map the Earth's subsurface. A controlled seismic source provides a low frequency seismic wave which travels through the subsurface of the Earth. At interfaces between dissimilar rock layers, the seismic wave is partially reflected. The reflected waves return to the surface where they are detected by one or more of seismic sensors. Ground vibration detected at the earth surface can have a very wide dynamic range, with particle displacement distances ranging from centimeters to angstroms. Data recorded by the sensors is analyzed to reveal the structure and composition of the subsurface.

Some seismic sensors (also known as seismometers or geophones) typically comprise an electric coil of wire immersed in a strong magnetic field. These electromagnetic sensors can be constructed as either moving magnet or moving coil types, with the latter exclusively favored for seismic exploration. In the moving coil version, the magnet is fixed to the case, which is then firmly planted in the earth, such that the case and magnet move in unison with ground displacements. The moving electrical coil is immersed in the magnetic field gap of a fixed magnet and the coil is loosely coupled to the geophone case by soft springs in such a way that the coil can only travel along a single axis. As the coil moves along this axis, relative to the fixed magnet, it will progressively cut through lines of magnetic flux, and generate a voltage and current at the electrical terminals of the coil, in proportion to the velocity of ground displacement. In the moving coil type, the coil forms the proof or reaction mass.

The coil and spring arrangement will have a resonant frequency dependent on the mass of the coil and the compliance of the springs. At frequencies well below resonance, the coil and magnet move in unison so that sensitivity is low and voltage or current output is small. As the frequency of vibrations increase upwards to and beyond the resonant frequency of the geophone the sensitivity and output increase, peak and flatten respectively. Typically the resonant frequency of geophones falls in the 10 to 30 Hz range, preference given to the low end. Low frequency resonance requires high spring compliance. This subsequently requires soft springs which in turn mandate precise design and construction of the sensor to achieve the required sensitivity, robustness, linearity and immunity to off axis distortion, necessary for seismic acquisition. The design tradeoffs among field strength, magnet size/weight, coil geometry and spring compliance are critical to design and construction of a geophone which has sufficient sensitivity, voltage-current output, linearity and robustness to simultaneously measure both the large and small surface vibrations described above.

A further type of seismic sensor in use for seismic surveying uses capacitance to generate the electrical signal. These are typically constructed as Microelectromechanical systems (MEMS) using micro machined silicon with metal plating applied to facing components on either side of a small plated and spring loaded proof mass. These MEMS sensors may have the advantage of small size and weight compared to a moving coil geophone. The movement of the MEMS proof mass relative to the outer fixed plates creates variable capacitance which can be detected as a vibration signal proportional to the acceleration of the sensor displacement. The springs are formed from regions of thin cut silicon, allowing a small linear displacement, and resonant frequencies above 1 kHz. The small capacitive surface area, high resonant frequency and restricted limit of linear travel mean that sensitivity will be quite low compared to a moving coil geophone. To counter this, specialized electronics is used to hold the MEMS geophone in force feedback state. This requires additional electronic circuitry and requires space and power and partially defeats the MEMS advantages of size and weight compared to the passive moving coil geophone.

The term proof mass may also be known as a reaction mass or seismic mass and is generally known in the art to refer to a mass in a seismic sensor which moves as a consequence of the earth moving during a seismic acquisition survey.

In one embodiment, the seismic sensor apparatus comprises: a body; a proof mass; at least one sensor arranged to detect movement of the proof mass relative to the body; electronic circuitry connected to the at least one sensor, the electronic circuitry being configured to receive and process an output of the sensor; and a power supply arranged to provide electrical power to the electronic circuitry, wherein the power supply is an integral part of the proof mass.

Known devices used for seismic surveying are typically large, expensive and have a relatively high weight. Since such apparatuses need to be transported to the location to be surveyed, their size and weight increases the time and effort required to perform a survey. The Geophone or MEMS sensor of such apparatuses enable ground particle displacement, caused by propagating seismic waves to be converted into a proportional voltage signal and subsequently recorded as a function of time. The ground particle displacement causes the geophone or MEMS body which is fixed to the ground, to move in unison with the amplitude of the propagating seismic wave at that position in space. The inertia of either the Geophone coil, or the MEMS silicon proof mass causes it to remain relatively static, such that the body then moves in relation to the coil or proof mass. This relative movement of the body and coil or proof mass is converted to a proportional voltage waveform, enabling the seismic wave to be recorded. To enable effective operation of the device, the sensitivity must be adequate to respond to minute ground movement with low distortion. This requires a strong, heavy, magnet and expensively wound coil in geophone sensors or alternately expensive precision micro-machined componentry and power consuming electronics in MEMS sensors.

By providing an apparatus for use in seismic surveying where the proof mass comprises a power supply, so arranged to maximize sensitivity, linearity and robustness, the apparatus is able to save both size and weight in comparison to known devices where the sensor and power supply are separate entities. This in turn makes seismic surveying more efficient.

The power supply may comprise a battery. The sensor may comprise one or more piezoelectric elements arranged to detect the movement of the proof mass.

A further type of seismic sensor can comprise a piezoelectric sensor. Thus, the seismic sensor of the present invention may comprise at least one piezoelectric sensor. Optionally, the sensor may comprise a reaction mass which comprises a power supply, such as a battery. One example of such a seismic sensor is described below.

In an embodiment, there is provided a seismic sensor apparatus comprising: a body; a proof mass movably located in a cavity of the body; and two sensors, each sensor comprising a planar piezoelectric element; wherein the piezoelectric elements are arranged on opposite sides of the proof mass to detect movement of the proof mass relative to the body and wherein the body is arranged to constrain said movement of the proof mass to reciprocation in a first direction between the piezoelectric elements.

In this aspect, the apparatus may also comprise electronic circuitry connected to the sensors, the electronic circuitry being configured to receive and process an output of the sensors; and a power supply arranged to provide electrical power to the electronic circuitry, wherein the power supply is an integral part of the proof mass. The power supply may comprise a battery.

Known devices used for seismic surveying typically use complex sensors such as a moving coil within a magnetic field. Embodiments included herein recognize that simpler lighter and more cost efficient apparatus can be constructed using piezoelectric elements. While piezoelectric pressure transducers are widely used in offshore marine surveys, the use of piezoelectric elements for onshore sensors is deemed inappropriate in the art as the accuracy of piezoelectric elements is deemed to be insufficient. However, the cost, size and weight gains afforded by having the proof mass comprising the power supply enable an increased number of such apparatuses to be deployed. The larger number of apparatuses, in comparison to historical and current practice, enable the accuracy of the system as a whole to be maintained and enhanced, despite any reduction of the accuracy of a single apparatus.

Various features will now be described which can be used in combination with either of the above-described aspects.

The one or more piezoelectric elements may comprise rigid ceramic. The rigid ceramic may comprise lead zirconate titanate (PZT). The sensor may comprise a substrate on which the piezoelectric element is supported. The substrate may comprise beryllium copper. The one or more piezoelectric elements may be pre-stressed. In other words, the piezoelectric element may be arranged in the apparatus such that, even in the absence of movement of the proof mass, the piezoelectric element is concave. The electronic circuitry may be arranged, at least, to amplify and/or digitally sample the output of the sensor whereby to process the output of the sensor.

The proof mass may be movably coupled to the body, and the apparatus may be arranged to constrain the movement of the proof mass relative to the body to reciprocation in a first direction. The at least one sensor may be arranged to detect said reciprocation of the proof mass in the first direction whereby to detect movement of the proof mass relative to the body.

This restriction of the movement of the proof mass can be a restriction to movement towards and away from the piezoelectric elements. Accordingly, the reciprocation of the proof mass between the piezoelectric elements can be generally perpendicular to the plane of the piezoelectric elements. The piezoelectric elements may be arranged such that their planes are generally parallel.

By constraining the movement of the proof mass relative to the body to reciprocation in a first direction, the apparatus is able to selectively detect the component direction of particle displacement. For example, three such piezoelectric sensors can be arranged with sensing axis in mutually orthogonal directions matching the Cartesian coordinates X, Y and Z. In this configuration, each individual sensor is insensitive, or blind to movement that is not aligned with its particular axis of sensing. This arrangement allows three sensors to be used to capture the full spatial vector component comprising the propagating elastic wave field.

The proof mass may be movably located in a cavity of the body. The proof mass may comprise an elongated member having a long axis, the body may comprise an elongated sleeve having a long axis, and the long axis of the elongated member may be located co-axially with the long axis of the elongated sleeve.

The first direction may be aligned with the co-axial long axes of the elongated member and the elongated sleeve. At least a part of a cross section of the elongated sleeve perpendicular to its long axis may conform to at least a part of a cross section of the elongated member perpendicular to its long axis, whereby to constrain the movement of the proof mass relative to the body to reciprocation in the first direction.

To enable efficient packaging of the proof mass, of which the power supply is integral, within the body, the proof mass may comprise an elongated member, which moves within a sleeve. The elongated member, for example, may be formed of a cylindrical battery with, or without, end pieces or a casing. The sleeve may be arranged with a diameter conforming to the battery and optionally any end pieces or casing. Therefore, with the minimal of additional material, the proof mass may be constrained in movement (enabling effective operation) whilst having the power supply (battery) integral to it.

The sleeve may comprise a cap assembly at each end arranged to retain the elongated member within the sleeve. At least one of the cap assemblies may comprise the at least one sensor.

The battery, or terminal, or end cap, or spacing member, may be fixed, adhered, or otherwise mechanically attached to the sensor, for example to the substrate or ceramic of the sensor, by adhesive, welding, soldering, through hole screw or any other suitable mechanical fastening such that the proof mass can alternately stress, push or pull the piezoelectric and substrate in both the forward and reverse directions, to cause both positive and negative polarity electric voltage or current signals.

The cap assemblies may comprise concave surfaces contacting the elongated member. The concave surfaces may together be arranged to exert a clamping force upon the elongated member whereby to constrain the movement of the elongated member, relative to the body, to reciprocation in the first direction. The elongated member may comprise adjustable elements arranged to enable a length of the elongated member along the long axis to be altered. The cap assemblies may be arranged whereby to enable a distance between the concave surfaces of the cap assemblies to be altered.

The sleeve may be capped to maintain the elongated member forming the proof mass within the sleeve. In addition, the cap assemblies may be arranged to clamp the elongated member so that it cannot move laterally within the sleeve (i.e. towards the side walls of the sleeve in a direction perpendicular to the long axis of the elongated member). This ensures that the movement of the elongated member is constrained. In addition, the elongated member, the sleeve and/or the cap assemblies may be arranged to be adjustable to ensure that the surfaces contact or are mechanically fixed to the elongated member.

Each cap assembly may comprise a flattened member arranged to contact the elongated member on a first surface of the flattened member, and a retaining member arranged to exert a clamping force on a perimeter of a second surface of the flattened member, the second surface facing the first surface. In embodiments, the retaining member may be integral to the cap assembly.

The concavity of the first surface may be caused by flexing of the flattened member resulting from the clamping force and an opposing force from contact of the elongated member with the first surface.

In embodiments, the apparatus may be constructed such that a flattened member is forced towards the elongated member via a clamping force on the perimeter thereof. This may cause the flattened member to flex, causing the concavity of the surface of the flattened member. This serves to effectively hold the elongated member in place, while enabling movement of the elongated member.

At least one of the flattened members may comprise the at least one sensor. At least one of the flattened members may comprise at least one piezoelectric element. The concavity of the flattened member may cause the piezoelectric element to be pre-stressed.

At least 75% of the proof mass by weight and/or by volume may be provided by the power supply. The body may be constructed from material selected to have a density which is comparable to that of the ground in which it is intended to be used.

The apparatus of any one of the preceding claims, wherein the body is provided with a protrusion to engage the proof mass so as to limit movement of the proof mass. This can prevent the proof mass pushing the piezoelectric element so far that it damages the piezoelectric element, for example in the event the apparatus is dropped.

According to a further exemplary embodiment, there is provided apparatus for use in seismic surveying, the apparatus comprising: a body; a proof mass; at least one sensor arranged to detect movement of the proof mass relative to the body; electronic circuitry connected to the at least one sensor, the electronic circuitry being configured to receive and process an output of the sensor; and a power supply arranged to provide electrical power to the electronic circuitry, wherein the power supply is an integral part of the proof mass.

FIG. 1 shows a simplified representation of a seismic surveying system 50 surveying the subsurface of the earth 51. The subsurface 51 may, for the purposes of this illustration be assumed to have a relatively uniform composition, except for layer 52. This layer may, for example, be a different type of rock to the rest of the subsurface 51, and therefore be differing in e.g. density and/or elastic velocity to the rest of the subsurface 51.

A seismic source 54 is located on the surface 56 of the earth. The seismic source 54 creates controlled seismic waves for propagation through the subsurface 51. Known examples of seismic sources include but are not limited to; explosives, vibroseis trucks and accelerated weight drop systems also known as thumper trucks. For example, a thumper truck may strike the surface 56 of the earth with a weight or "hammer" creating a shock which propagates through the subsurface 51 as seismic waves. These seismic waves are represented by arrows 58, 60 and 62 and propagate downwards through the subsurface from the seismic source 54.

The seismic waves are then reflected, at least partially, from the surface of the layer 52. This is caused by the density and/or elastic velocity differential between the layer 52 and the rest of the subsurface 51. The reflected seismic waves 58', 60' and 62' then propagate upwards from the layer 52 to the surface 56. At the surface 56, the reflected seismic waves 58', 60' and 62' are detected by seismic sensors 64, 66 and 68.

The seismic source 54 may also excite high amplitude surface interface waves 57 which travel along the surface 56 with slow velocity, and are detected concurrently with the deeper returning reflections 58', 60 ' and 62' which are much lower in amplitude due to cumulative effects of energy loss during propagation, such as: geometrical spreading of the wave front, interface transmission loss, weak reflection coefficient and travel path absorption. The cumulative effect of these losses may amount to 75 dB, and in cases more than 100 dB, in amplitude difference between various waveforms recorded by sensors 64, 66 and 68.

Based on this detection of waves, the sensors may store, and/or transmit, data indicative of the detected seismic wave. This data can then be analyzed to determine information about the composition of the subsurface 51—for example the location of layer 52.

The above describes a known seismic surveying system which puts the purpose of the seismic sensors into context. It will be appreciated that the above is only an example, and more complex subsurface compositions (i.e. other than single layer 52) will likely be present in the subsurface. Consequently, the reflection pattern of waves may be substantially more complex that that illustrated. For example, a part of a downward propagating seismic wave may not be reflected by the interface, and thereby travel through the layer 52. This wave my subsequently be reflected off a lower surface of the layer 52, meaning that multiple reflections may be received by any given seismic sensor.

The above described principle is not limited to surface based seismic sensing, and may be applied to marine seismic surveying. In this case, the subsurface 51 is covered by a layer of water. The seismic sensors 64, 66 and 68 may be provided on the seabed, or alternatively on or within the water. Alternative seismic sources 54 may be provided for marine seismic surveying, such as air guns and plasma sound sources.

Figure 2:
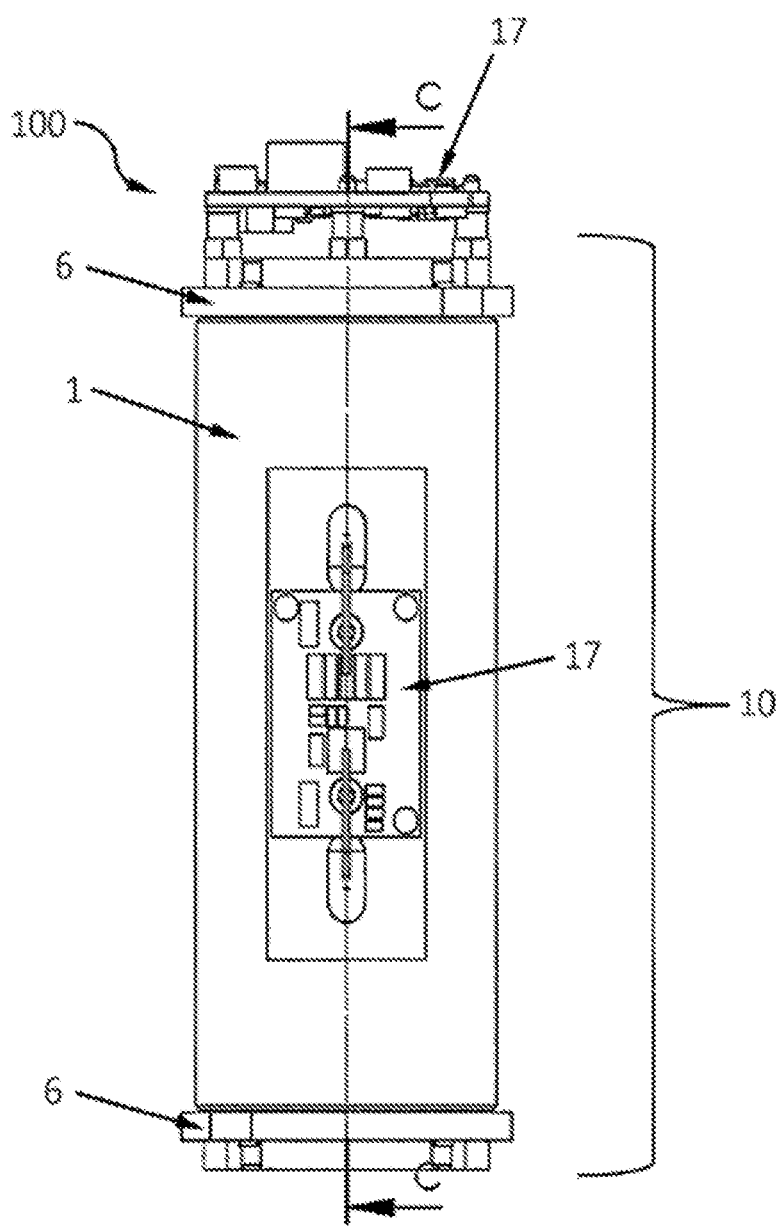
FIG. 2 shows an overview of an apparatus according to an embodiment for use in seismic surveying.
Figure 3:
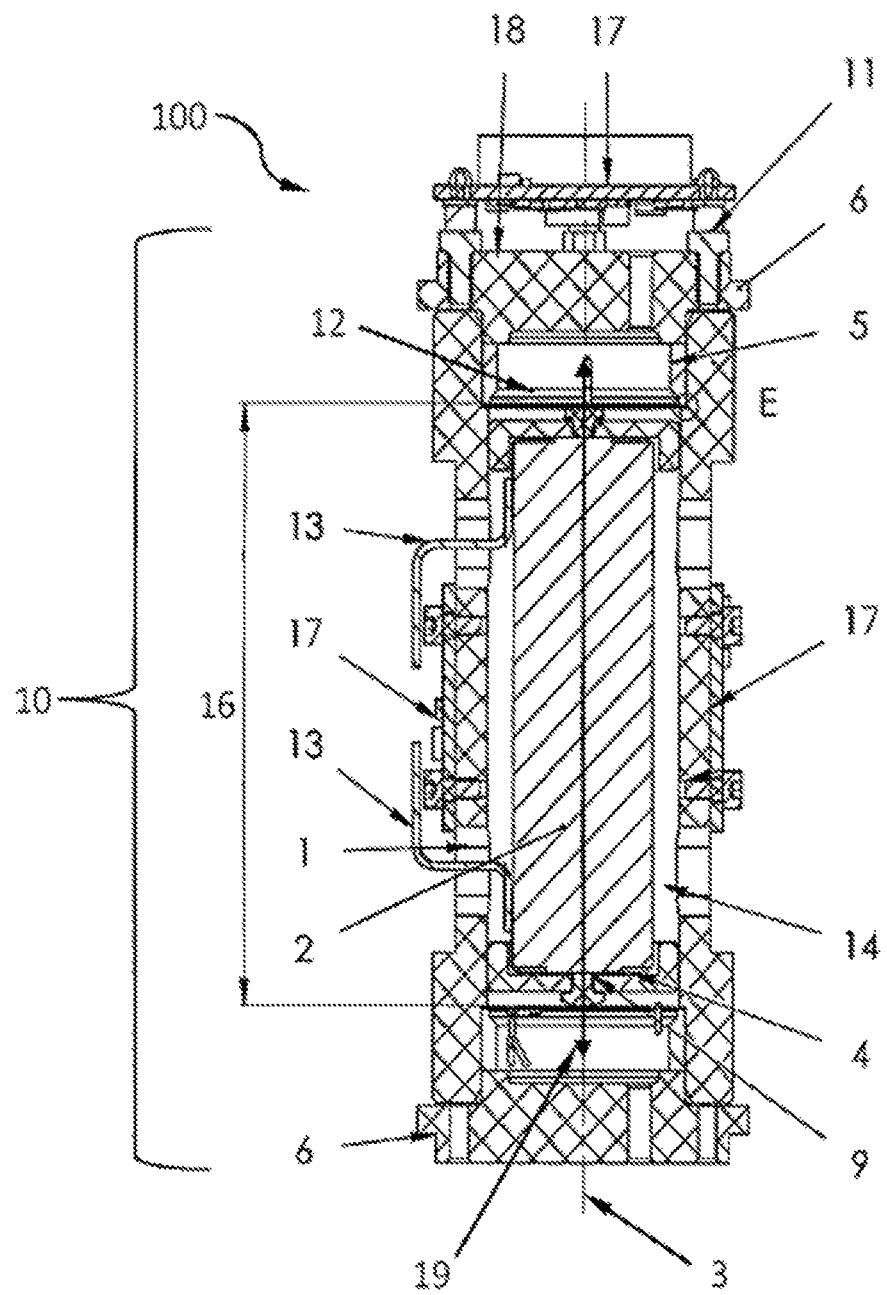
FIG. 3 shows a cross section of the same apparatus.
Figure 4:
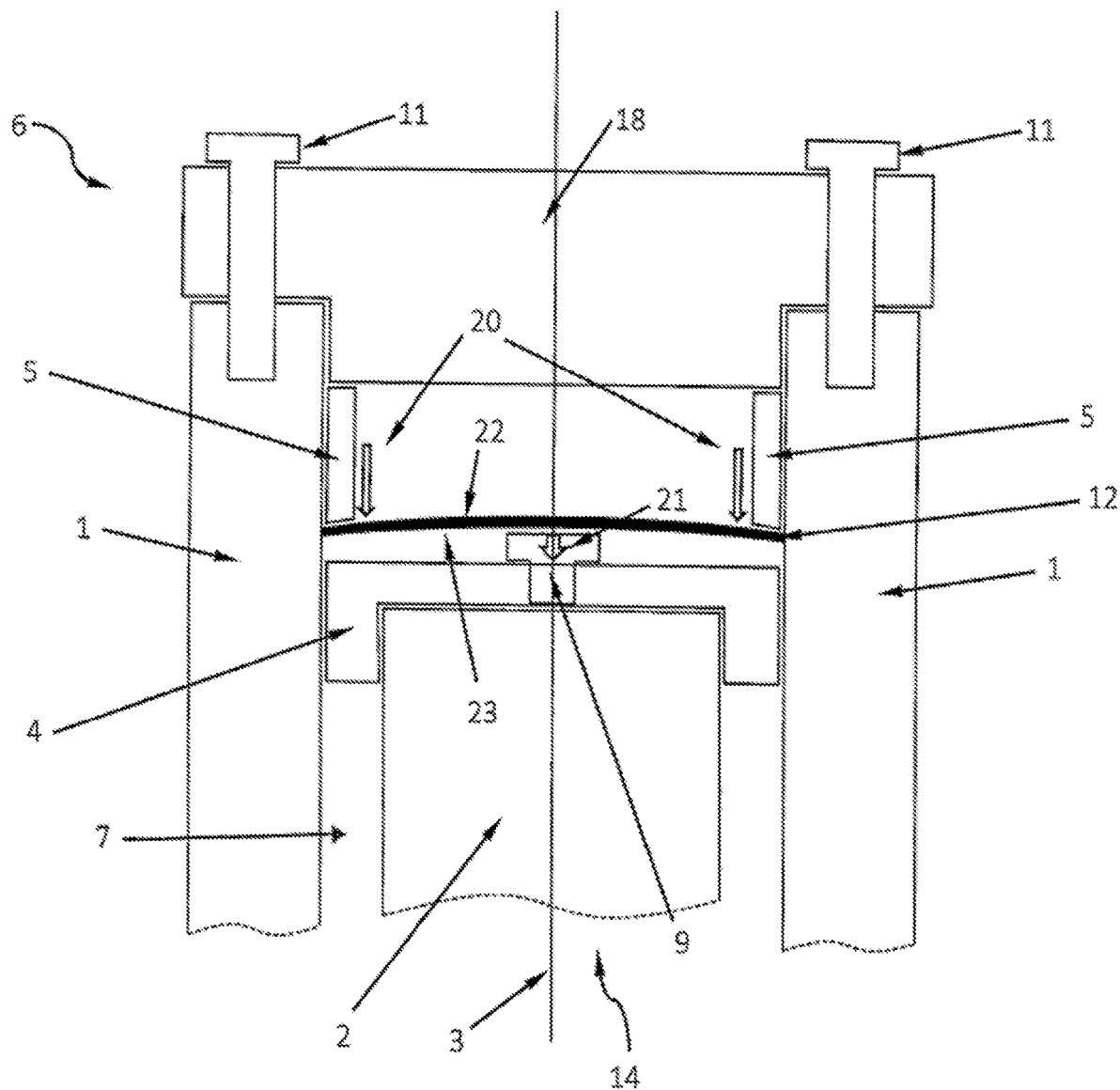
FIG. 4 shows a detailed view of one end of the cross section of FIG. 3.

An apparatus 100 for use in a seismic sensing system 50 (such as described above) will now be described with reference to FIGS. 2-4. FIG. 2 shows an outer surface of the apparatus 100. FIG. 3 shows the same apparatus 100 viewed in cross section along line C-C shown in FIG. 2. FIG. 4 shows a close up view of one end of the cross section of the apparatus 100.

FIG. 2 shows the apparatus 100 in overview. The apparatus 100 comprises a body 10, which in this example comprises a sleeve 1 with end cap assemblies 6 located at the ends of the sleeve 1. A proof mass and at least one sensor arranged to detect movement of the proof mass relative to the body (not shown, described below) are provided within the body. The apparatus 100 comprises electronic circuitry 17 (shown both on the top and on the side of the body). This electronic circuitry is connected to the sensor, and is arranged to process the output of the at least one sensor, for example by amplifying, digitally sampling, transmitting and/or storing the output of the sensor. It will be appreciated that the electronic circuitry 17 may alternatively be located within the body, or in a unit connected to the body via wires (not shown).

FIG. 3 shows the apparatus 100 of FIG. 2 taken in cross section along line C-C. The sleeve 1 is shown, with the end cap assemblies 6 located at each end. The electronic circuitry 17, mounted to the body, is also shown. Within the sleeve 1 is proof mass 14. In this embodiment it will be assumed that both the sleeve 1 and proof mass 14 are elongated cylinders (the sleeve 1 being a hollow cylinder), with long axis of the elongated proof mass 14 located co-axially with the long axis of the elongated sleeve 1. The direction of these long axes is marked by line 3 and will be referred to henceforth as the first direction 3.

In some embodiments, the proof mass 14 is therefore movably coupled to, and located within, the body 10 of the apparatus. The apparatus, by mechanisms which will be described in more detail below, may constrain the movement of the proof mass 14 relative to the body 10 to reciprocation in the first direction 3, shown by double ended arrow 19. That is, the proof mass 14 may be able to move, at least to a limited extent, back and forth in the first direction 3, but may be restricted in moving in a direction perpendicular to the first direction 3.

In some embodiments, the proof mass 14 comprises a power supply, e.g. one or more batteries, 2 which provide electrical power to the apparatus, and in particular to the electronic circuitry 17 via wires 13. In addition, in one embodiment, the proof mass 14 comprises adjustable elements 4 and 9, represented by proof mass end pieces 4 and adjustment screws 9. The adjustable elements 4 and 9 enable the length of the proof mass 14 along its long axis to be altered. The overall length of the proof mass is represented by arrow 16. The adjustable elements 4 and 9 may be used to thereby compensate for any differences or non-standardization between different batteries 2.

It will be observed that the majority of the proof mass 14 is formed by the battery 2. In other words, the battery 2 is integral to the proof mass 14. This may be taken to indicate that a substantial portion of the mass, volume and/or structure of the proof mass 14 is provided by the battery. For example at least 75% of the proof mass by weight and/or by volume may be provided by the battery 2.

In some embodiments, end cap assemblies 6 may be located at each end of the sleeve 1, and close the sleeve to retain the proof mass 14 within the body of the apparatus 100. The end cap assemblies 6 also comprise at least one sensor arranged to detect movement of the proof mass relative to the sleeve 1 in the first direction 3. These end cap assemblies 6 will be described in more detail in FIG. 4; nevertheless, in FIG. 3 are shown an end cap assembly body 18, attached to the sleeve via one or more screws 11, and a retaining member 5 retaining a flattened member 12.

FIG. 4 shows an end cap assembly 6 in more detail. It will be appreciated that, at least in the present embodiments, the two end cap assemblies are similar, and therefore the description of one is applicable to both.

As described above, the end cap assembly 6 closes the end of the sleeve 1 to retain the proof mass 14 within the body of the apparatus. The proof mass 14 comprises a battery 2, and adjustable elements 4 and 9. The end cap assembly 6 comprises an end cap body 18, retaining member 5 and a flattened member 12.

The end cap body 18 may be fixed to the end of the sleeve 1. This may be done by retaining screws 11 as shown. Alternatively, the end cap body 18 may be, for example, affixed to the sleeve using adhesive, heat welding, acoustic welding, plastic overmolding, a push or snap fit, or may be threaded to be screwed into the sleeve.

In some embodiments, the end cap body 18 may be abutted by a retaining member 5 within the sleeve. The retaining member may be a separate element, as shown. However, in other embodiments the end cap body 18 and the retaining member 5 may be a single piece. In this embodiment, the sleeve 1 is cylindrical, and as such the retaining member 5 may be in the form of a ring, conforming to the inner surface of the cylindrical sleeve 1. The retaining member 5 exerts a retaining force, represented by arrows 20, upon the perimeter of the upper surface 22 of flattened member 12. In this embodiment, it will be appreciated that the flattened member 12 is a disk.

In some embodiments, contacting the lower surface 23 of the flattened member 12 is the proof mass 14. In this embodiment, it is the adjustment screw 9 of the adjustable elements which contacts the surface 23. The flattened member 12 thereby exerts a clamping force 21, equal to the retaining force 20, onto the proof mass 14. The proof mass 14 may contact the surface 23 of the flattened member at or near the center of the flattened member 12—in other words, the contact point is closer to the center of the flattened member 12 than it is to the perimeter.

In some embodiments, the flattened member 12 may be flexible in the first direction 3, by virtue of being relatively thin in the first direction in comparison to directions perpendicular to the first direction 3. Therefore, the proof mass 14 may be allowed to reciprocate in the first direction 3 while being clamped by the flattened member 12.

In some embodiments, the flattened member 12 may comprise one or more sensors which measure the deflection of the flattened member 12. For example, the flattened member may comprise one or more piezoelectric elements which detect the movement of the proof mass 14 relative to the sleeve 1. As is known in the art, a piezoelectric element, upon being deflected, generates a voltage or charge output proportional to the deflection or strain. This voltage or charge output can be detected, for example by electronic circuitry 17, to generate a signal indicative of the movement of the proof mass 14.

In some embodiments, the one or more piezoelectric elements may comprise rigid ceramic, such as lead zirconate titanate (PZT). The one or more piezoelectric elements may be combined with (e.g. bonded to or sandwiched by) support material or substrate, which provides the flattened member 12 with sufficient elastic compliance and strength to clamp the proof mass 14 without fracturing, and which has a bending stiffness which is greater than that of the rigid ceramic piezoelectric element. The support material may be electrically conductive. The flattened member 12 may thus comprise a disk shaped piezoelectric sensor.

FIG. 4 shows the surface 23 of the flattened member 12 which contacts the proof mass 14 being concave towards the proof mass. This may be by design (i.e. the flattened member 12 is constructed with a suitable shape) however this may also be caused by the forces on the flattened member 12. In other words, the concavity of the surface 23 may be caused by flexing of the flattened member 12 resulting from the clamping force 20 and an opposing force from contact of the proof mass 14 with the surface of the flattened member 12 (which as noted above is provided substantially in the center of the flattened member 12). To enable this pre-load stress, the apparatus may be configured such that the retaining members 5 of the end cap assemblies 6 force respective flattened members 12 inwards to a sufficient extent that their curvature is unavoidable (due to the non-compressibility of the proof mass 14). An appropriate pre-load stressing force, and therefore curvature, can be achieved by varying the length of the proof mass 14 in the first direction 3 using the adjustment screw 9.

This has certain effects. First, any piezoelectric sensor elements can be pre-stressed. This gives a more predictable response by the piezoelectric element to any flexing of the flattened member 12, and thereby improves the accuracy of the sensing. Furthermore, a concave surface may provide an inwardly radial force on the proof mass 14. This may serve to center the proof mass within the sleeve 1, thereby ensuring minimal contact (and thus friction) between the proof mass 14 and the sleeve 1. Also, if a piezoelectric element is pre-stressed, then movement of the proof mass away from the piezoelectric element is sensed as the element moves towards a more "at rest" position. In the absence of pre-stressing, this movement away from the piezoelectric element may not be detected.

Consequently, the end cap assembly 6, by virtue of the flattened member 12 held by the retaining member 5 and contacting the proof mass 14, serves two purposes: first to clamp the proof mass 14, coupling it to the sensor body (sleeve 1 and end cap assemblies 6) and restricting movement of the proof mass relative to the body to reciprocation in the first direction 3; and secondly to sense any movement of the proof mass relative to the body in that first direction 3.

It has been found that a height to diameter ratio for the proof mass 14 of between 2:1 and 5:1 is advantageous for apparatuses for use in seismic surveying for the oil and gas industry. Where the body conforms to the shape and size of the proof mass, such proportions allow an appropriate weight for the proof mass whilst affording relatively easy deployment of the apparatuses in the ground.

In use, many of the apparatus 100 are placed on or in the surface of the earth. Each such apparatus may, for example, be attached to a spike which is pushed into the earth. Alternatively, the entire apparatus may be buried, or placed at depth in a borehole. Each apparatus 100 may be placed with the first direction vertical. The arrival of a compressional seismic wave causes the body of the apparatuses 100 to move with a strong vertical component. The inertia of the proof mass 14 causes it to resist moving with the displacement of the body, and consequently the proof mass 14 will move relative to the body. This movement causes the flattened members 12 to be deflected. It can be seen that movement of the proof mass relative to the body in the first direction causes the flattened member to increase or decrease the degree of deflection relative to the degree of deflected of the flattened member when it is "at rest" i.e. when the proof mass is not moving relative to the body. By virtue of the piezoelectric sensors within the flattened members 12, this deflection is detected, and may be sampled, transmitted and/or stored by the electronic circuitry 17. The sampled data may then be analyzed to determine the composition of the subsurface 51. Consequently, the above described apparatus is able to detect seismic waves, while maintaining a compact and lightweight body.

Figure 5:
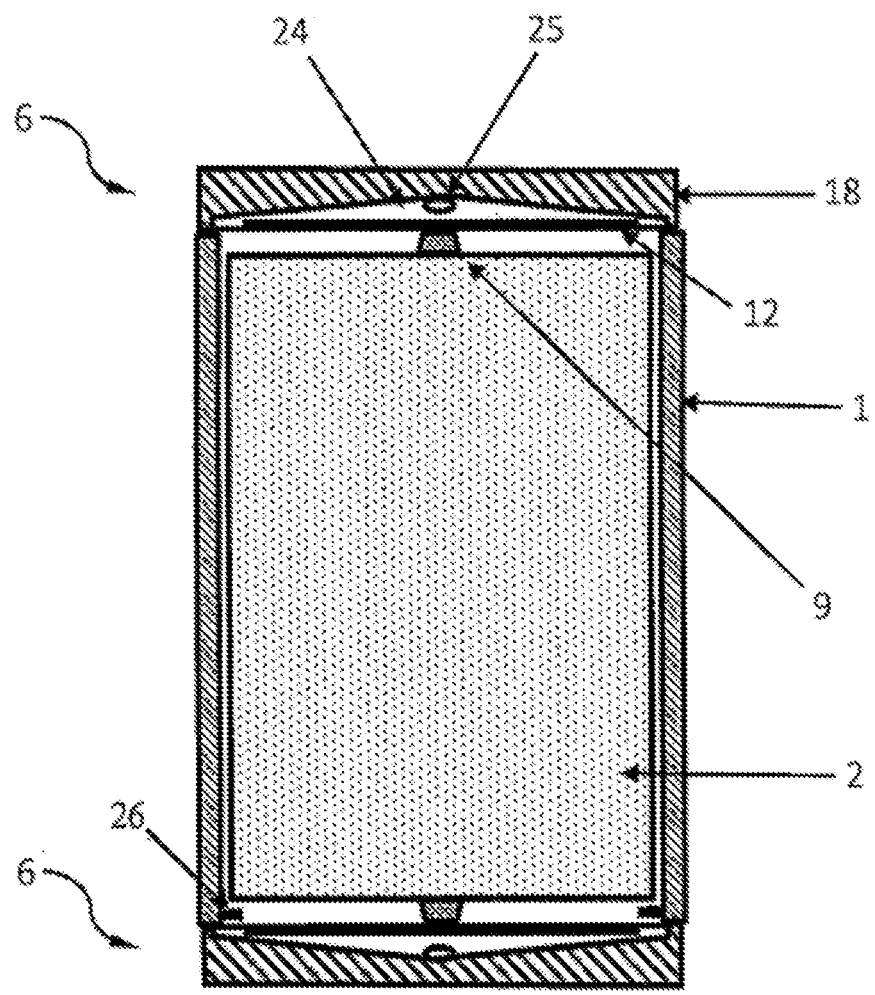
FIG. 5 shows a cross sectional view of a further embodiment of an apparatus for use in seismic surveying.
Figure 6:
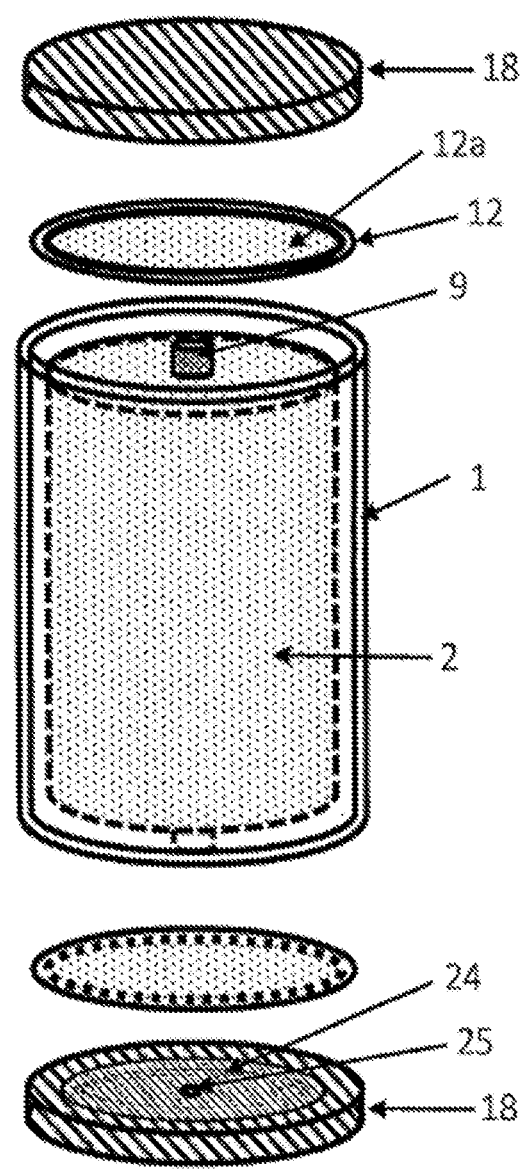
FIG. 6 shows the apparatus of FIG. 5 in a three dimensional exploded view.

FIGS. 5 and 6 show a further embodiment of an apparatus for use in seismic surveying. This apparatus shares many features in common with the apparatus described above, similar features will be provided with the same reference numbers. It will be appreciated that features of this further embodiment may be combined with those of the embodiment described above.

As such, the apparatus comprises a sleeve 1 with end cap assemblies 6 at each end. A proof mass 2 is located within the sleeve, and coupled to the sleeve via flattened members 12, which are held by end cap bodies 18. The sleeve is provided with a protrusion 26, in the form of a shoulder, which can limit the movement of the proof mass to protect the piezoelectric element in the event the apparatus is dropped.

Each end cap comprises a cavity 24 into which the flattened member 12 may be displaced. Each cavity further comprises a displacement limiter 25. The purpose of the displacement limiter 25 is to limit the amount by which the flattened member can be distorted by limiting the displacement of the proof mass 2 within the apparatus. This may prevent the flattened member 12 from being damaged. In usual operation of the device, i.e. when sensing seismic signals, the displacement of the proof mass 2 will be insufficient for the flattened member 12 to contact the displacement limiter 25, and therefore the displacement limiter 25 has no adverse effects on the operation of the apparatus. However, should the apparatus be dropped, or otherwise subjected to a large acceleration, the flattened member 12 may be distorted by the displacement of the proof mass 2 by an amount sufficient for the flattened member to contact the displacement limiter 25. The displacement limiter 25 prevents or reduces any further displacement, thereby preventing the flattened member 12 from being damaged by over-distortion. As such, the position of the displacement limiter 25 may be arranged such that the distortion of the flattened member 12 is limited to a predetermined amount based on e.g. the construction of the flattened member 12.

In some embodiments, the displacement limiter 25 may be rigid, or may be a flexible member able to absorb a limited amount of impact and thereby reduce the likelihood of damage to the flattened member 12.

In the above the clamping force exerted by the flattened members 12 upon the proof mass 14 has been described as constraining the movement of the proof mass 14, relative to the body, to reciprocation in the first direction 3. In the alternative, or additionally, at least a part of a cross section of the sleeve 1 perpendicular to its long axis may conform to at least a part of a cross section of the proof mass 14 perpendicular to its long axis. The effect of this is to constrain the movement of the proof mass relative to the body to reciprocation in the first direction. For example, the proof mass end pieces 4 may have an outer diameter which closely conforms to the internal diameter of the sleeve 1. Thus, little movement of the proof mass 14 is possible perpendicular to the first direction 3. The sleeve 1 to proof mass 14 conformance is of sufficiently close tolerance to avoid rocking or rotational motion about the center of gravity of the proof mass 14 assembly. The abutting surfaces of the proof mass 14 and/or sleeve 1 may be coated with low friction material to enable movement of the proof mass 14 relative to the sleeve.

In some embodiments, the proof mass 14 and sleeve 1 may not be cylindrical as described above, and may take any shape. This may, in part, be dependent on the size and shape of the battery 2. For example, a cuboid battery may be used with a correspondingly shaped sleeve 1.

In the above, the proof mass 14 was provided with adjustable elements 4 and 9 to enable the length of the proof mass 14 to be altered. This may be required as the length of e.g. the battery 2 may not be sufficiently standardized. In other embodiments, such length adjustment may be achieved using manufactured spacers of appropriate dimensions, having differing sizes of end piece 4, injection molded parts, or over length spacers which are machined or milled to correct dimension during manufacture. In further embodiments, it is possible that the end cap assemblies 6 may comprise suitable adjustable elements, to enable the distance between the facing concave surfaces 23 of the flattened members 12 (at each end) to be altered. This may be enabled by providing adjustment elements in the cap, for example by arranging the screws 11 to enable a gap between the sleeve and cap to be adjusted. Equally, the length of the retaining member 5 in the first direction may be adjusted by using one of a plurality of different length retaining members 5 or machining the retaining member 5 to a desired length during manufacture. Overall, suitable length adjustment members may be components of, or attached to, the proof mass and/or the piezoelectric substrate.

In yet further embodiments, adjustment may be provided by altering the length of the sleeve during the manufacturing processes, or by having differing length of sleeve from which a desired length may be selected. Equally, the battery terminals may be manufactured with shape and length suitable for the purpose of pre-tensioning the flattened member 12

In some embodiments, to address batteries which are not sufficiently standardized across multiple apparatuses, a relatively small proportion of the overall weight of the proof mass may be provided by a dead weight.

The adjustment screw 9 of the proof mass 14 ensures that the contact between the flattened member 12 and the proof mass is over a small area. In some embodiments, this screw may not be present, and a suitable projection may serve the same purpose, i.e. to contact the flattened member over an area which is small relative to the overall area of the surface 23 of the flattened member 12.

In some embodiments, a piezoelectric sensor may not be used, and a magnetic transducer system or capacitive transducer system, or electrostatic transducer system or photo-optical transducer system or otherwise may be used to sense the movement of the proof mass 14.

While the above has been described in terms of an elongated cylinder, other configurations whereby the battery 2 is integral to the proof mass 14 are envisaged. For example, one or more batteries may be held with their long axes parallel to the plane of a sensor, such as an elongated ridged piezoelectric sheet. Alternatively the flattened member 12 could be held sandwiched between two reaction mass batteries, with one above and one below the piezoelectric sensor. This would still provide the weight savings envisaged above.

In some embodiments, the transducer comprises an even number of flattened members 12, arranged evenly at opposite ends of the proof mass 14. Each flattened member 12 may further support one or more piezoelectric elements bonded to the surface or surfaces of the flattened member 12 to form piezoelectric sensors. The sensors may be arranged and wired such that the relative motion of the sleeve 1 and the reaction mass 14, will flex paired flattened members 12 in opposite directions. In this arrangement, relative motion of the proof mass 14 will cause one flattened member 12 to become more convex while the opposite flattened member becomes less convex. In one embodiment where the piezoelectric element is bonded to the outer face 22 of each flattened element 12, then the single motion of the proof mass 14 will cause a positive voltage or current in one sensor and a negative voltage output in the other sensor, and vice versa when the motion of the proof mass 14 is in the opposite direction. When the pairs of sensors are wired in series, observing polarity of the electrical output, the voltage amplitude will be twice as large compared to a single sensor—that is the output of the piezoelectric sensors constructively adds increasing the signal. Similarly, when the pairs are correctly wired in parallel, the current output will be twice as large. This enables construction of a transducer with higher sensitivity for nearly the same cost and size.

This configuration, which may be considered a differential push-pull configuration, also provides a lower noise floor, reduced by approximately the square root of the number of differential piezoelectric elements. This improvement occurs through electrical summation of the signals from the sensors, and partial cancellation of any noise, for example the independent random thermionic self noise generated by each individual transducer. This configuration, and the differential input of the analogue electronics also provides additional attenuation of external common-mode noise sources such as inductively induced power line hum or radio wave interference.

Furthermore, this configuration also provides a reduction in harmonic distortion otherwise caused by each individual sensor exhibiting a degree of non-linear transform characteristics. For instance, because the flattened member 12 may have a spring compliance which does not perfectly obey Hooke's law, the response of the flattened member 12 to the movement of the proof mass may be non-linear. For a single sensor this would be observed in the form of even order harmonic distortion components in the output of the sensor, which differ depending on which direction the flattened member 12 is flexed. When the output of one sensor is combined with the second sensor of the pair, at the opposite end of the proof mass 14, and flexing in the opposite sense in relation to the orientation of the piezoelectric material, the distortion components will also be of opposite polarity and the even order harmonics are subsequently suppressed when the output is summed by the differential input of the electronics.

While the proof mass 14 and body have been described as being attached, it will be recognized that this may indicate both physical attachment—for example via the clamping force provided by the flattened member 12—as well as a magnetic or electrical attachment. In other words, in embodiments, the proof mass 14 may be suspended within the body of the apparatus via a magnetic or electrical field, without being in physical contact with any part of the body.

As discussed above, microelectromechanical system (MEMS) oscillators are timing devices that generate highly stable reference frequencies, which can measure time. These reference frequencies may be used to sequence electronic systems, manage data transfer, define radio frequencies, and measure elapsed time. MEMS clock generators are MEMS timing devices with multiple outputs for systems that need more than a single reference frequency.

By convention, the term oscillator usually denotes integrated circuits (ICs) that supply single output frequencies. MEMS oscillators include MEMS resonators, sustaining amps, and additional electronics to set or adjust their output frequencies. These circuits often include phase locked loops (PLLs) that produce selectable or programmable output frequencies from the upstream MEMS reference frequencies. MEMS oscillators are commonly available as 4-pin or 6-pin ICs that conform to printed circuit board (PCB) solder footprints previously standardized for quartz crystal oscillators.

In seismic surveying, multiple sensors may be used in what is called a seismic spread. This can be in the form of a land survey of sensors cabled together. Another seismic spread may be a nodal spread (e.g., marine or land or transition zone), where individual nodes are spread out over an area, and each node acts as a sensor. Another seismic spread can be a towed marine seismic spread, where multiple seismic streamers having many seismic sensors are towed by a boat.

As part of a seismic survey involving many sensors and especially in full nodal spreads, or partial nodal spreads, it is important that each individual sensor node, or group of sensors, have a reliable clock/timing associated therewith. This can be achieved in a number of ways, but having local clocks is one way. These clocks can be synchronized in a number of ways such as with a GPS signal, or other wireless signal, or through cabled communications with a master clock.

Clock synchronization is a simpler task with cabled land systems, or marine cabled spreads. However, complications from reliability and costs are found with clock timing in nodal spreads, partial or full.

One aspect of feasibility for seismic survey systems relates to quality and cost of ownership. If proper timing is achieved, but at a cost that is not commercially feasible, the system is a failure. Therefore, adequate and good performance at a reasonable cost of ownership is important. Advancement in technology coupled with reduced cost is very desirable.

Embodiments of the present disclosure are directed towards a MEMS oscillator to serve as a timing device in a seismic sensor. Additionally and/or alternatively, embodiments include a seismic spread device and method that incorporates a MEMS oscillator system to provide improved timing at improved cost of ownership and manufacture.

Existing oscillator technology may involve excessive cost for Chip Scale Atomic Clocks ("C SAC") (typically around 1000 USD) and power consumption for Oven Compensated Crystal Oscillators ("OCXO") (typically around 1 W). Both technologies are also quite sensitive to mechanical shocks.

Under some conditions a GPS based timing reference will not work or can be too expensive or unreliable. For example, during a rainstorm or when the sensors are covered by large amounts of wet snow or when the area where they are planted are flooded. The nodes may also be deployed in shallow water.

Embodiments included herein may use MEMS Oscillators for timing and, as such, these MEMS oscillators may significantly reduce the power consumption in seismic nodes. Power consumption will decide how much battery capacity is needed, as well as the size of the node. The size of the node, especially for deep water seabed, will be a very important factor when it comes to node cost. Also, when it comes to charging and data offloading infrastructure node size is very important for the cost. The cost advantage of a MEMS Oscillator over prior solutions can be in the magnitude of 2 to 100 times cheaper, smaller.

Figure 7:
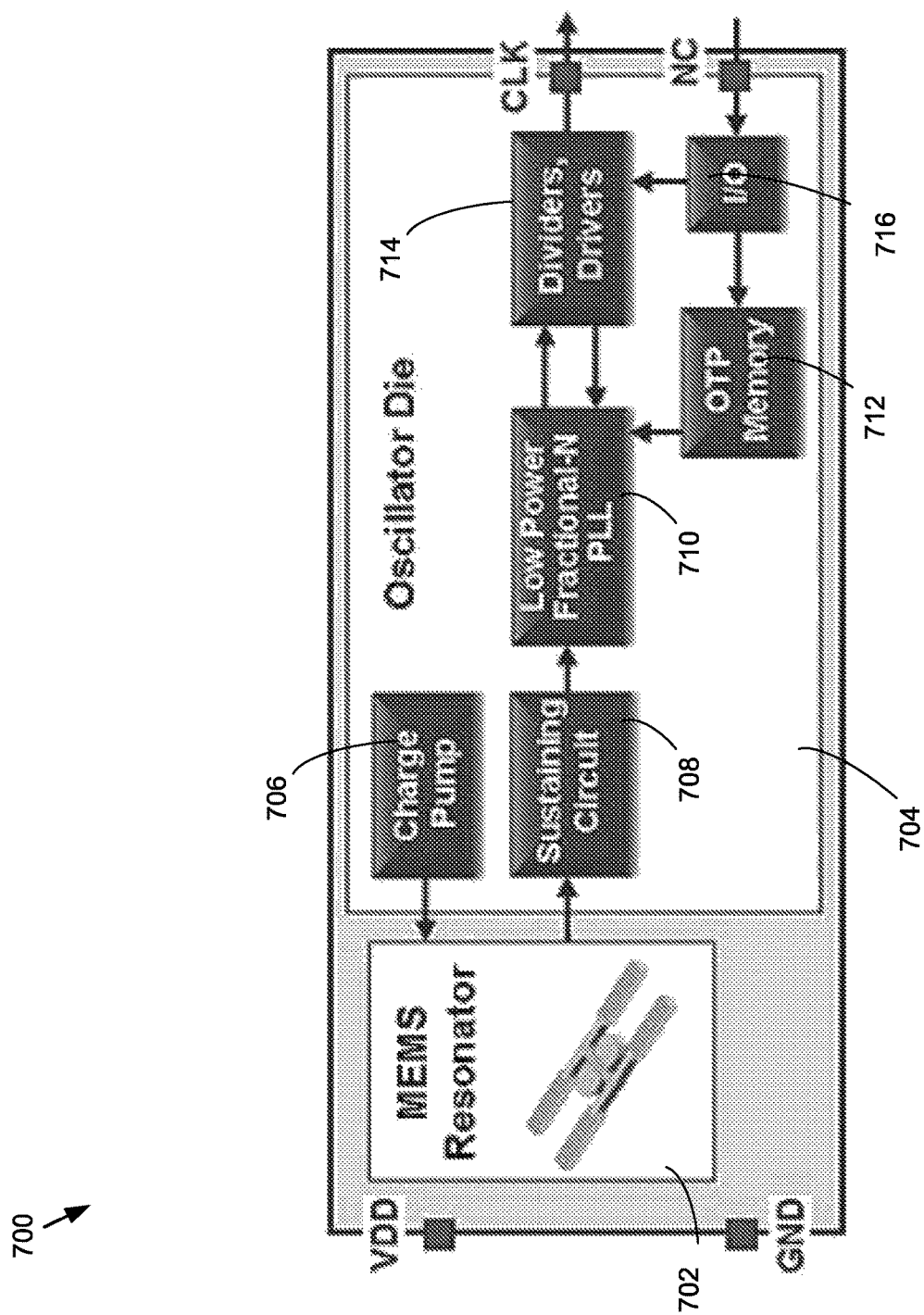
FIG. 7 shows a schematic of a MEMS oscillator device in accordance with the teachings of the present disclosure.

Referring now to FIG. 7, an embodiment depicting an example MEMS oscillator 700 in accordance with the present disclosure is provided. MEMS oscillator 700 may include MEMS resonator 702, which may be configured to vibrate at high frequency and integrated circuit 704. IC 704 may be configured to synthesize a very stable and accurate output frequency based on MEMS resonator 702 as reference combined with temperature sensing and correction data typically obtained during calibration. IC 704 may include various types of circuitry, some of which may include, but is not limited to, charge pump 706, sustaining circuit 708, low power phase locked loop 710, memory 712, dividers/drivers 714 and I/O circuitry 716.

In some embodiments, charge pump 706 may operate as an excitation circuit, in other words, it may cause MEMS resonator 702 to vibrate. In response, sustaining circuit 708 may be configured to sustain this oscillation so that MEMS resonator 702 is able to maintain its oscillatory behavior.

MEMS oscillators are commercially available from SiTime™. It should be noted that oscillator 700 may be used in conjunction with any of the embodiments included herein, such as those shown in FIGS. 1-6.

Accordingly, by using such an oscillator in a seismic node instead of CSAC and OCXO (or even a very high performance TCXO) the power consumption may be significantly reduced. By reducing the oscillator power consumption, the amount of batteries and the total size of the node can be dramatically reduced. This gives a much lower cost of a node. When comparing to CSAC, the cost of the oscillator itself will be the largest contributor to reduced node cost. In this way, a MEMS oscillator will at least be two orders of magnitude cheaper than CSAC.

The small size of a MEMS oscillator is also a large advantage when trying to make a small and inexpensive node. A MEMS oscillator is typically using a very small package similar to what is used for the smallest electronics components while the most commonly used CSAC is 40×35×12 mm.

The first MEMS oscillators introduced did not have significant advantages over crystal based oscillators when it comes to power consumption and cost. This has changed, and oscillators with just a few microamperes of current draw are now available in frequencies below 1 MHz and very high stability medium power MEMS oscillators are now available for higher frequencies. Another advantage of using MEMS oscillators is much better reliability.

The very stable medium power MEMS oscillators have a power consumption which is a bit on the high side for a low power node (similar to a GPS receiver when used as timing reference in a land node). In some embodiments, in order to reduce the total power consumption, the MEMS oscillator may be combined with a lower quality low power oscillator where the frequency can be controlled by applying a voltage to a control pin (VCXO) or by using a digital interface. By waking up the medium power oscillator for just a few seconds and by counting the number of clock pulses for the two oscillators the low power oscillator can be disciplined using the higher power more accurate oscillator as reference. Using an OCXO the same way would not be possible since it requires tens of minutes to reach the stated stability, a MEMS oscillator will typically reach the stated stability within 100 ms.

Most current seismic nodes use linear correction of the sampling time. The time may be injected into the node (or recorded externally) when the internal clock is started, the time at retrieval is stored (or recorded externally) and interpolation may be applied to the seismic data to correct for the time drift which is considered linear. The node oscillator may also be disciplined using an external high accuracy reference prior to deployment to limit the linear drift. In a system with more than one oscillator in the proposed concept the most accurate oscillator may be disciplined before deployment which then during acquisition this oscillator may be used to discipline the oscillator which is used as direct time reference for digitizing the seismic signals.

When it comes to timing performance for a seismic node it is not the overall accuracy which is most important, but the nonlinear drift since the linear drift is easily compensated. To get the best performance for a seismic node the calibration of the oscillator may be focused to the temperature range where the node will be operated. A deep water seabed node will typically not see temperatures above 30 C (when onboard the boat) then it proceeds to the seafloor where the temperature is about 4 degrees. For a low power node, the temperature will not be influenced by the dissipation from the electronics. If the oscillator is using a high order polynomial for temperature correction all effort may then be used to make the oscillator as stable as possible within 0-30 degrees while the performance outside this temperature window would not be important. In this way, the performance may be improved even further. As such, oscillators may be optimized for different operation environments like seabed, transition zone, arctic, desert or general purpose land.

For a land node the MEMS oscillator may be a backup solution used when GPS reception is blocked. In such a setup it would also be possible to use the GPS to discipline the MEMS oscillator when GPS reception is working to improve the MEMS oscillator accuracy.

In one implementation, a seismic spread system that may use a MEMS oscillator as a timing reference is provided. The MEMS oscillator may be of any suitable design, including, but not limited to, that provided in FIG. 7. The system may include a plurality of nodal seismic sensor units. The system may also include a plurality of MEMS oscillator clock devices, wherein each of the plurality of MEMS oscillator clock devices is associated with a respective one of the plurality of nodal seismic sensor units. The devices may be configured to input time synchronization to the seismic system. Each MEMS oscillator clock device may include a MEMS resonator in communication with an integrated circuit.

In some implementations, the seismic spread system may include a marine node spread and/or a land nodal spread. The seismic spread system may include units of plurality of nodes coupled with a respective MEMS oscillator. The integrated circuit may include a charge pump and a sustaining circuit in communication with the MEMS resonator. The integrated circuit may further include a phase locked loop in communication with the sustaining circuit.

In another implementation, a seismic nodal sensor is provided. The sensor may include a geophone and a MEMS oscillator clock device in communication with the geophone. The MEMS oscillator clock device may include a MEMS resonator in communication with an integrated circuit. The MEMS oscillator clock device may be configured to input time synchronization to the seismic nodal sensor.

In some implementations, the geophone may be a three axis geophone device. The seismic sensor may be connected with one or more additional seismic sensors by way of wireless signals. The seismic nodal sensor may include a plurality of sensors that are cabled and associated with the MEMS oscillator clock device. The seismic nodal sensor may be a blind nodal sensor group. The integrated circuit may include a memory. The integrated circuit may include a charge pump and a sustaining circuit in communication with the MEMS resonator. The integrated circuit may further include a phase locked loop in communication with the sustaining circuit.

Figure 8:
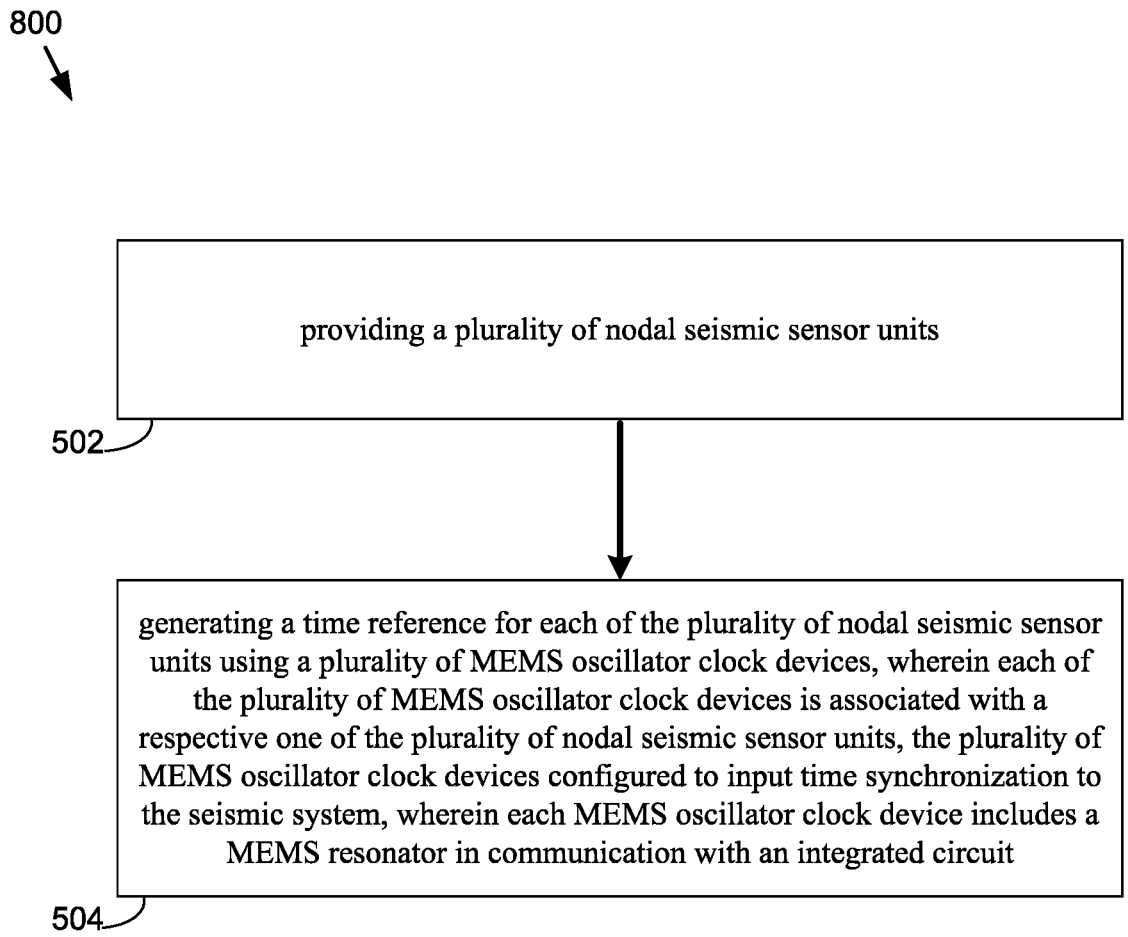
FIG. 8 shows a method consistent with an embodiment of the present disclosure.

In another implementation, and as shown in FIG. 8, a method for using a MEMS oscillator as a timing reference is provided. The method may include providing 802 a plurality of nodal seismic sensor units. The method may further include generating 804 a time reference for each of the plurality of nodal seismic sensor units using a plurality of MEMS oscillator clock devices. Each of the plurality of MEMS oscillator clock devices may be associated with a respective one of the plurality of nodal seismic sensor units, thereby inputting time synchronization to the seismic system. Each MEMS oscillator clock device may include a MEMS resonator in communication with an integrated circuit.

In some implementations, the seismic spread system may include a marine node spread. The seismic spread system may include a land nodal spread. The seismic spread system may include units of plurality of nodes coupled with a respective MEMS oscillator. The integrated circuit may include a charge pump and a sustaining circuit in communication with the MEMS resonator. The integrated circuit may further include a phase locked loop in communication with the sustaining circuit.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, the apparatus may be designed to be disposable or may be re-usable. The apparatus described are suitable for use in both land and marine seismic acquisition activities. The features of the claims may be combined in combinations other than those specified in the claims.

The block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

The terminology used herein is for the purpose of describing particular embodiments and is not intended to be limiting of the disclosure. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the marine seismic streamer described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A seismic spread system, comprising:
a plurality of nodal seismic sensor units; and
a plurality of MEMS oscillator clock devices, wherein each of the plurality of MEMS oscillator clock devices is associated with a respective one of the plurality of nodal seismic sensor units, wherein each of the plurality of MEMS oscillator clock devices is configured to input time synchronization to a respective nodal seismic sensor unit of the plurality of nodal seismic sensor units, wherein each MEMS oscillator clock device of the plurality of MEMS oscillator clock devices comprises a MEMS resonator in communication with an integrated circuit, wherein the MEMS resonator is configured to vibrate at a first frequency, and the integrated circuit is configured to:
generate a clock signal having a second frequency based on the first frequency in which the MEMS resonator vibrates, wherein the second frequency corresponds to a temperature range in which the respective nodal seismic sensor unit of the plurality of nodal seismic sensor units is configured to operate within; and provide the clock signal to the respective nodal seismic sensor unit of the plurality of nodal seismic sensor units, wherein the clock signal is configured to compensate for a nonlinear drift due to temperature.

2. The seismic spread system of claim 1, wherein the seismic spread system comprises a marine node spread.

3. The seismic spread system of claim 1, wherein the seismic spread system comprises a land nodal spread.

4. The seismic spread system of claim 1, wherein the integrated circuit comprises a charge pump and a sustaining circuit in communication with the MEMS resonator.

5. The seismic spread system of claim 4, wherein the integrated circuit further comprises a phase locked loop in communication with the sustaining circuit.

6. A seismic nodal sensor, comprising:
a sensor element; and
a MEMS oscillator clock device in communication with the sensor element, wherein the MEMS oscillator clock device is configured to input time synchronization to the seismic nodal sensor, wherein the MEMS oscillator clock device comprises a MEMS resonator in communication with an integrated circuit, wherein the MEMS resonator is configured to vibrate at a first frequency, and the integrated circuit is configured to:
generate a clock signal having a second frequency based on the first frequency in which the MEMS resonator vibrates, wherein the second frequency corresponds to a temperature range in which the respective nodal seismic sensor unit of the plurality of nodal seismic sensor units is configured to operate within; and
provide the clock signal to the seismic nodal sensor, wherein the clock signal is configured to compensate for a nonlinear drift due to temperature.

7. The seismic nodal sensor of claim 6, wherein the sensor element comprises a three axis sensor element device.

8. The seismic nodal sensor of claim 6, wherein the seismic nodal sensor is configured to connect with one or more additional seismic sensors by way of one or more wireless signals.

9. The seismic nodal sensor of claim 6, wherein the seismic nodal sensor comprises a plurality of sensors associated with the MEMS oscillator clock device.

10. The seismic nodal sensor of claim 6, wherein the seismic nodal sensor comprises a blind nodal sensor group.

11. The seismic nodal sensor of claim 6, further comprising a primary clock device configured to provide timing to the seismic nodal sensor, wherein the MEMS oscillator clock device is configured to communicate with the primary clock device to intermittently provide time synchronization to the seismic nodal sensor.

12. The seismic nodal sensor of claim 6, wherein the integrated circuit comprises a memory.

13. The seismic nodal sensor of any one of claim 6, wherein the integrated circuit comprises a charge pump and a sustaining circuit in communication with the MEMS resonator.

14. The seismic nodal sensor of claim 13, wherein the integrated circuit further comprises a phase locked loop in communication with the sustaining circuit.

15. The seismic nodal sensor of any one of claim 6, wherein the sensor element comprises a piezoelectric sensing element.

16. The seismic nodal sensor of claim 6, further comprising a power source for supplying power to the seismic nodal sensor, wherein the power source constitutes at least part of a reaction mass associated with the sensing element.

17. A method for using a MEMS oscillator as a timing reference comprising:
providing a plurality of nodal seismic sensor units; and
generating a time reference for each of the plurality of nodal seismic sensor units using a plurality of MEMS oscillator clock devices, wherein each of the plurality of MEMS oscillator clock devices is associated with a respective one of the plurality of nodal seismic sensor units, wherein each of the plurality of MEMS oscillator clock device is configured to input time synchronization to a respective nodal seismic sensor unit of the plurality of nodal seismic sensor units, wherein each MEMS oscillator clock device of the plurality of MEMS oscillator clock devices comprises a MEMS resonator in communication with an integrated circuit, wherein the MEMS resonator is configured to vibrate at a first frequency, and the integrated circuit is configured to:
generate a clock signal having a second frequency based on the first frequency in which the MEMS resonator vibrates, wherein the second frequency corresponds to a temperature range in which the respective nodal seismic sensor unit of the plurality of nodal seismic sensor units is configured to operate within; and
provide the clock signal to the respective nodal seismic sensor unit of the plurality of nodal seismic sensor units, wherein the clock signal is configured to compensate for a nonlinear drift due to temperature.

18. The method of claim 17, wherein the plurality of nodal seismic sensor units corresponds to a marine node spread.

19. The method of claim 17, wherein the plurality of nodal seismic sensor units corresponds to a land nodal spread.

20. The method of claim 17, a plurality of nodes is coupled with a respective MEMS oscillator.

21. The method of claim 17, wherein the integrated circuit comprises a charge pump and a sustaining circuit in communication with the MEMS resonator.

22. The method of claim 21, wherein the integrated circuit further comprises a phase locked loop in communication with the sustaining circuit.

23. The seismic spread system of claim 1, wherein the integrated circuit is configured to provide the clock signal to the respective nodal seismic sensor unit of the plurality of nodal seismic sensor units in response to detecting that a global positioning system (GPS) signal is lost.

* * * * *

UNITED STATES PATENT AND TRADEMARK OFFICE
CERTIFICATE OF CORRECTION

PATENT NO. : 11,402,526 B2
APPLICATION NO. : 16/488774
DATED : August 2, 2022
INVENTOR(S) : Vidar Husom It is certified that error appears in the above-identified patent and that said Letters Patent is hereby corrected as shown below:

On the Title Page

Item (73) Assignee:
Replace "WesternGeco L.L.C., Houston, TX (US)"
With --Schlumberger Technology Corporation, Sugar Land, TX (US)--

Signed and Sealed this
Twenty-eighth Day of February, 2023

Katherine Kelly Vidal
*Director of the United States Patent and Trademark Office*